United States Patent [19]
Terasaki

[11] 3,749,914
[45] July 31, 1973

[54] VEHICLE ATTITUDE SENSOR
[75] Inventor: Richard M. Terasaki, Rolling Hills Estates, Calif.
[73] Assignee: The United States of America as represented by the Secretary of the Air Force, Washington, D.C.
[22] Filed: Dec. 21, 1970
[21] Appl. No.: 99,951

[52] U.S. Cl.......... 250/83.3 H, 244/1 SA, 244/3.16, 244/77 SS
[51] Int. Cl. .............................................. B64c 3/50
[58] Field of Search ..................... 250/83.3 H, 1 SA; 328/133; 244/1 SA, 1 SS, 77 SS, 3.16

[56] References Cited
UNITED STATES PATENTS
3,427,453   2/1969   Gill et al. ...................... 250/83.3 H
3,512,085   5/1970   Peterson et al. ................. 328/133 X Primary Examiner—Harold A. Dixon
Attorney—Harry A. Herbert, Jr. and George Fine

[57] ABSTRACT

An apparatus to control the alignment of the spin axis of a communications satellite with the major axis of an eccentric, near polar orbit. The on-board prediction of the time of apogee passage and autonomous control at apogee for the spin axis alignment with the local vertical is also provided. Thus, cumulative errors in the apogee epoch predictions due to orbital period errors are avoided.

3 Claims, 4 Drawing Figures

PATENTED JUL 31 1973

INVENTOR.
RICHARD M. TERASAKI
BY Harry A. Herbert Jr.
George Fine and
ATTORNEYS

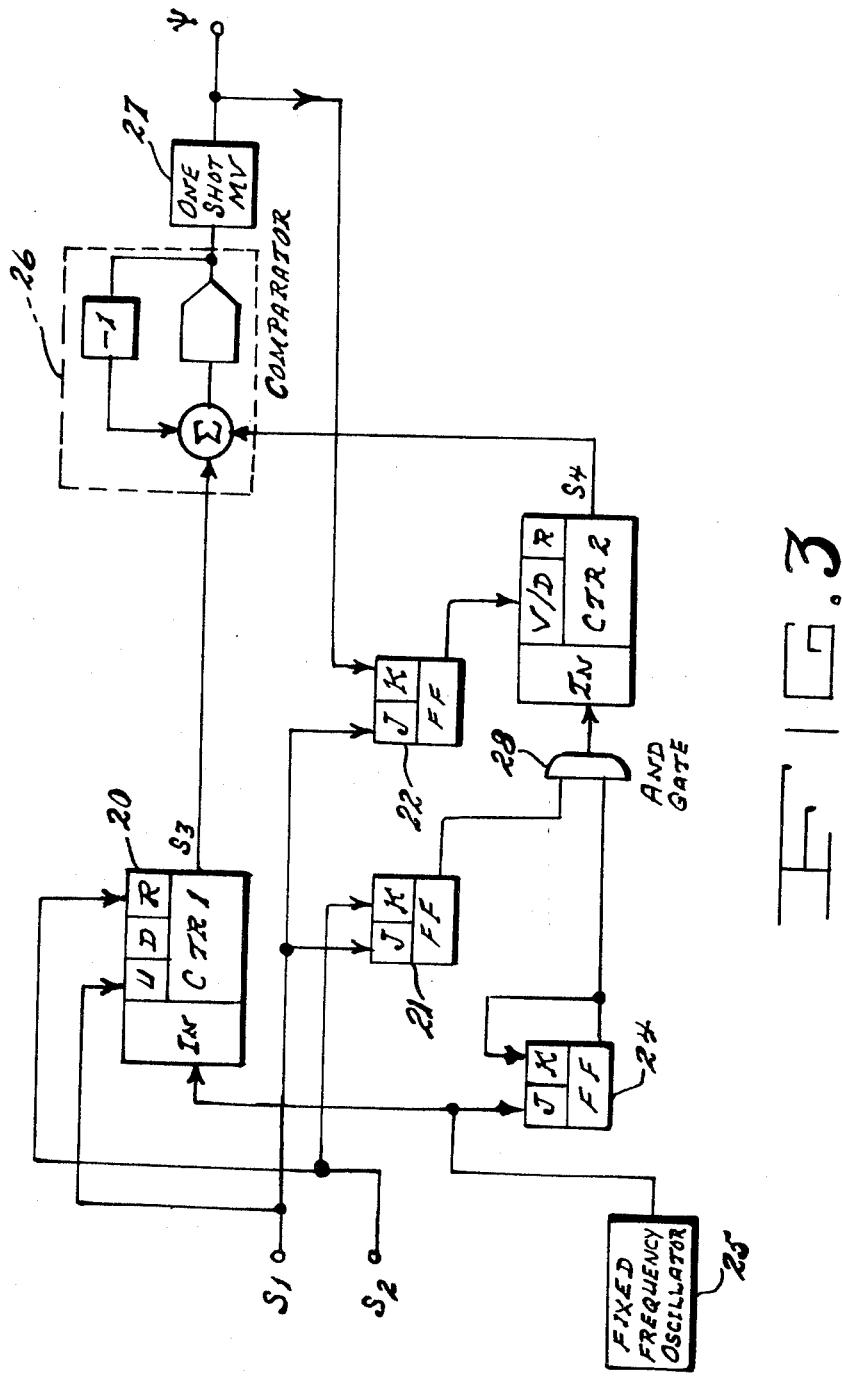

VEHICLE ATTITUDE SENSOR

BACKGROUND OF THE INVENTION

The present invention relates broadly to a communication satellite system and in particular a control system appratus for the spin axis alignment of the satellite with it orbital major axis.

In satellite systems to provide communication between northern latitudes it is most desirable to utilize modest weight long-life spacecraft which are phased in eccentric near-polar 24 hour orbits. A satellite commnication system which has autonomous attitude control minimizes the amount of ground personnel control function relative to the satellite operation. Thus, minimum ground personnel functions in highly desirable, except for an initial period occurring shortly after launch when compensation must be made for gross attitude errors and to correct and estimate orbital parameters. In order to effectively utilize a satellite in a communication systems, the attitude control must be precisely maintained. The prior art satellite systems utilized standard spinner components, such as, nutation damper, axial jet, and sun and earth sensors to maintain the spacecraft orientation. However, these prior art approaches to satellite stabilization are not sufficiently accurate to provide the attitude control required in a satellite communication system. The present invention will provide an improved attitude control system which will utilize and process the earth sensor signals.

SUMMARY OF THE INVENTION

The present invention utilizes earth sensor signals to trigger timing circuits which pulse the axial jets to provide attitude control for the satellite. The earth sensor signals are processed by an on-board attitude control processor to pulse the axial jets and to determine the time of apogee passage. The attitude control processor utilizes phase lock circuits to achieve the required axial jet pulsing and utilizes logic circuitry to provide time interval measurements to predict the time of apogee passage.

It is one object of the invention, therefore, to provide an improved vehicle attitude sensor apparatus utilizing earth sensor signals to pulse axial jets to maintain a precise vehicle attitude.

It is another object of the invention to provide an improved vehicle attitude sensor apparatus utilizing earth sensor signals to provide time interval measurements to predict the time of apogee passage.

It is yet another object of the invention to provide an improved vehicle attitude sensor apparatus having autonomous control at apogee for the spin axis alignment of the vehicle with the local vertical.

These and other advantages, objects and features of the invention will become more apparent from the following detailed description when taken in conjunction with the illustrative embodiments in the accompanying drawings.

DESCRIPTION OF DRAWINGS

FIG. 3 is a block diagram of the vehicle attitude sensor apparatus in accordance with this invention.

DESCRIPTION OF PREFERRED EMBODIMENT

Figure 2:
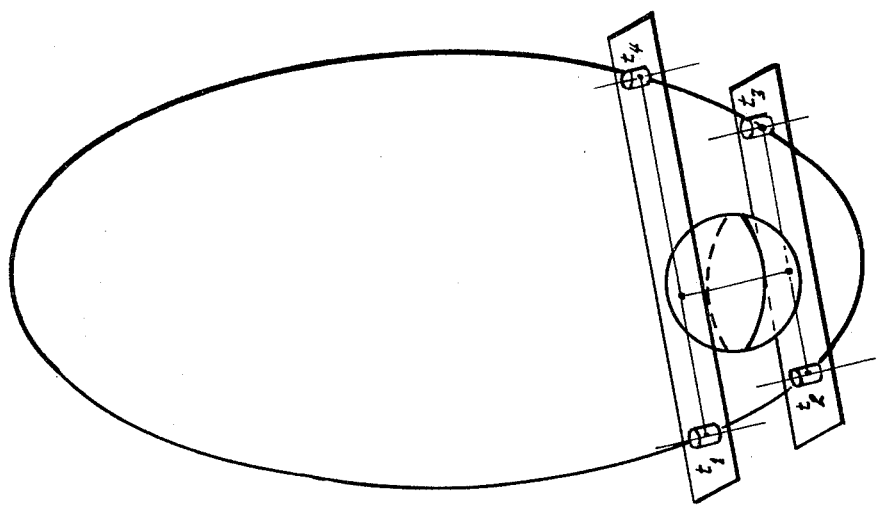
FIG. 2 is a pictorial representation of the normal earth sensor scan planes tangent to the earth's surface.
Figure 1:
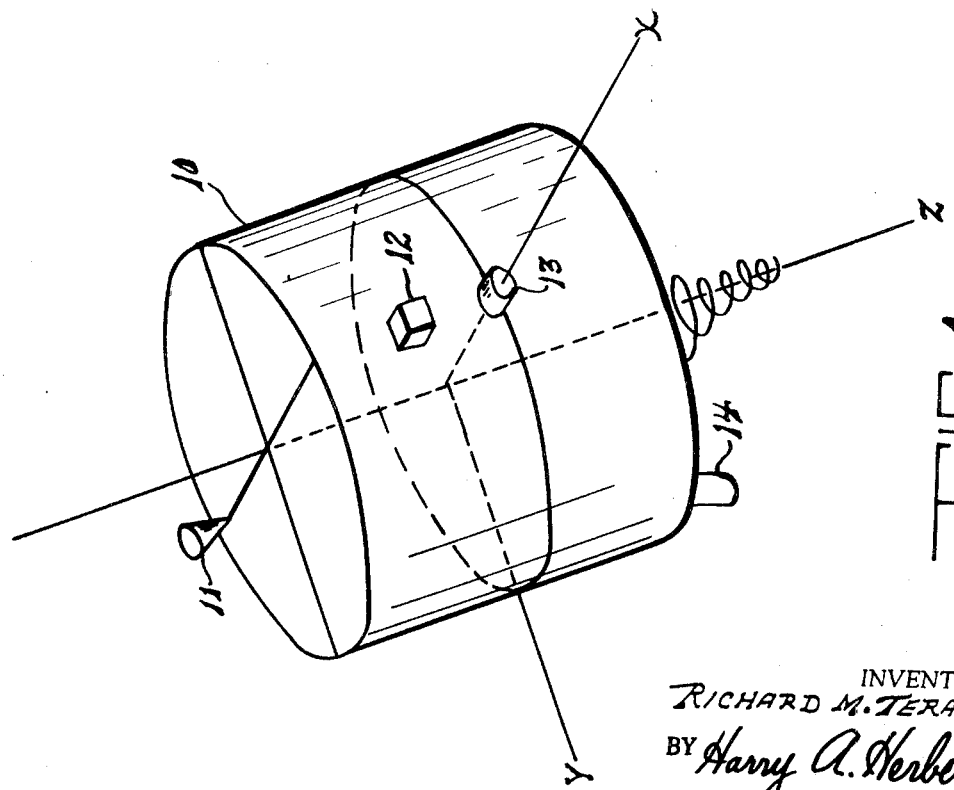
FIG. 1 is an illustration of a spacecraft with the arrangement of the spinner components.

Referring now to Figure, there is shown a spacecraft 10 utilizing an axial jet, 11, and sun and earth sensors 12, 13 14. The axial jet 11 is utilized in a pulsed mode with "on" duration small compared to the spin period. The desired effect of an axial jet pulse is to impart a small angular change $\Delta\theta$ in the orientation of the total angular momentum. The sun sensor 12 is utilized to sense the angle between the spin axis and the sun direction and yield an electronic pulse signal indicating the time when the sun direction is coincident with the body $xz$ plane. Two earth sensor assemblies are used, and are denoted apogee, 14 and normal 13 sensors. Each assembly uses bolometers in conjunction with narrow field-of-view telescopes. The apogee earth sensor 14 is canted with respect of the spin axis ($z$ axis) by an angle subtended by the earth at the nominal apogee altitude, spacecraft spin, therefore, produces a conical scan about the spin axis. The normal sensor 13 is aligned orthogonal to the spin axis so that spin, per se, yields the scanning of a plane normal to the spin axis.

A spin stabilized spacecraft utilizing damped nutation has an inertially fixed angular momentum which is coincident with the spin axis. As the spacecraft traverses one orbit there will be two distinct tiem intervals where the normal earth sensor does not view the earth. There will be also four distinct times indicating a transition between these periods. Geometrically the transitions correspond to tangency of the plane which are scanned by the normal earth sensor and the earth surface are shown in FIG. 2. The time interval between these transitions may be measured by using logic circuitry which operates upon the normal earth sensor signal and a fixed frequency oscillator. The time from apogee passage $t_i$ when any of these transitions occur, is functionally dependent upon any of the time intervals. Thus, after the time interval measurements are taken, the time-to-apogee $\tau$ starting from $t_4$, may be approximated from a predetermined estimate of the orbital period T, and the elapsed time from $t_4$. A particular time interval measurement is suggested;

$$\delta = (t_4 - t_3) - (t_2 - t_1) \tag{1}$$

Expresing the approximate relationship between $t_4$ and $\delta$ by $\theta_4(\delta)$ and denoting the time elapsed from $t_4$ by $\Delta$, the following sequence of identifies may be utilized to generate the time-to-apogee signal $$\begin{aligned}\tau &= T - t \\ &= T - t_4 - (t - t_4) \\ &= T - \theta_4(\delta) - \Delta\end{aligned} \tag{2}$$

Namely, at the event associated with $t_4$ determine from the measurement $\delta$ the value $T - t_4$ and count-down from the value the time elapsed from $t_4$ to get the time-to-apogee, $\tau$. Apogee passage is then indicated by the zero-crossing $\tau = 0$. A practical approximation of $t_4$ from the measurement $\delta$ may be asserted by the simple linear relationship $$t_4 = \tilde{t}_4 + K\delta \tag{3}$$

$K$ being a proportionality constant and $\tilde{t}_4$ being the nominal time of the transition $t_4$.

The control of the attitude is effected through pulsing of the axial jet, which spins with the spacecraft body. With each pulse a small change $\Delta\theta$ results in the orientation of the angular momentum. The proper direction of the angular momentum change relative to the sensed direction to the sun or the earth is required. Thus, the proper phasing of jet pulse relative to the periodic sensor signals is required.

In the initial attitude acquisition, to increase or decrease the solar aspect angle phase of the axial jet pulses must occur at zero or 180° with respect to the sun sensor pulse indicating coincidence of the $xz$ plane with the sun direction. In addition, in order to actively process the angular momentum about the sun line, a phase of ± 90° with respect to this same sun sensor pulse is required. Near apogee, to align the angular momentum with the local vertical, or equivalently, to center the earth in the cone scanned by the apogee earth sensor, the phase of the axial jet pulses must occur midway between the substantially periodic pulses indicating the space-to-earth and earth-to-space crassings of the apogee seneor optical axis with the earth limb.

Turning now to FIG. 3, there is shown a block diagram of the vehicle attitude sensor apparatus utilizing a counter 20 to receive a pair of input signals $S_1$, $S_2$. The input signal pair $S_1$, $S_2$ is simultaneously applied to J-K flip flops 21, 22, respectively. Flip flop 21 receives both the input signals $S_1$, $S_2$, while flip flop 22 receives input signal $S_{21}$ only. A fixed frequency oscillator 25 provides an output signal to flip flop 24 and counter 20. A comparator 26 receives the output signal from counter 20. The one-shot multivibrator 27 receives the output signal from comparator 26 and provides an input signal to flip flop 22. The and gate 28 receives the output signals from flip flops 21, 24 and provides a single input to counter 29. The counter 29 provides an output signal to comparator 26.

A unified interpretation of the various axial jet pulse phasing requirements is that given an ordered pair of repetitive pulse signals $S_1(t)$ and $S_2(t)$ with the same frequency, a third repetitive pulse signal whose pulse occurs midway between the given pair may be generated. The relevance of this interpretation is that commonality in circuit components is a byproduct. With respect to phasing relative to the sun direction, define the pair of input signals $S_1(t)$ and $S_2(t)$ as both being identical to the pulse signal indicating coincidence of the $xz$ plane with the sun direction. Using a counter 20 in tandem with a fixed frequency oscillator 25 which is generating pulses with a repetition frequency much higher than the spin frequency, a sawtooth signal $S_3(t)$ may be generated by resetting the counter 20 with each pulse in $S_2(t)$. Assume that a fourth signal $S_4(t)$ is generated by counting up every other oscillator pulse beginning with each pulse emanating in $S_1(t)$ and counting down every other oscillator pulse beginning with the event that $S_4(t) + S_3(t) > 0$. If counting up or down is supressed with the pulse in $S_2$, it may be shown that the time $t_k$ where $S_4(t) + S_3(t_k) = 0$, approaches the midpoint of the input $S_1$ and $S_2$ pulses. Thus, a comparator 26 with input $S_3(t) + S_4(t)$ and hysteresis connected to a one-shot pulse yields a signal $\psi(t)$ which is (in the steady-state) phased 180° from the input signal. The pulse associated with $\psi$ is used to initiate the count-down process in the second counter 29. Similar circuits operating upon $S_1$ paired with $\psi$ and $\psi$ paired with $S_2$ yield pulses phased at 90° and 270° with respect to the original sun pulse signal.

The same circuit elements may be utilized to generate the pulses for the attitude corrections near apogee. Thus, the basic input signal pairs $S_1$, $S_2$ are to be derived from the apogee sensor signal. Specifically, $S_1(t)$ is defined as the pulse derived from the space-to-earth crossing and $S_2(t)$ is defined from the earth-to-space crossing. The pulse signal $\psi(t)$ bisects the interval between the space-to-earth and earth-to-space crossing, as is desired for axial jet pulsing.

Figure 4:
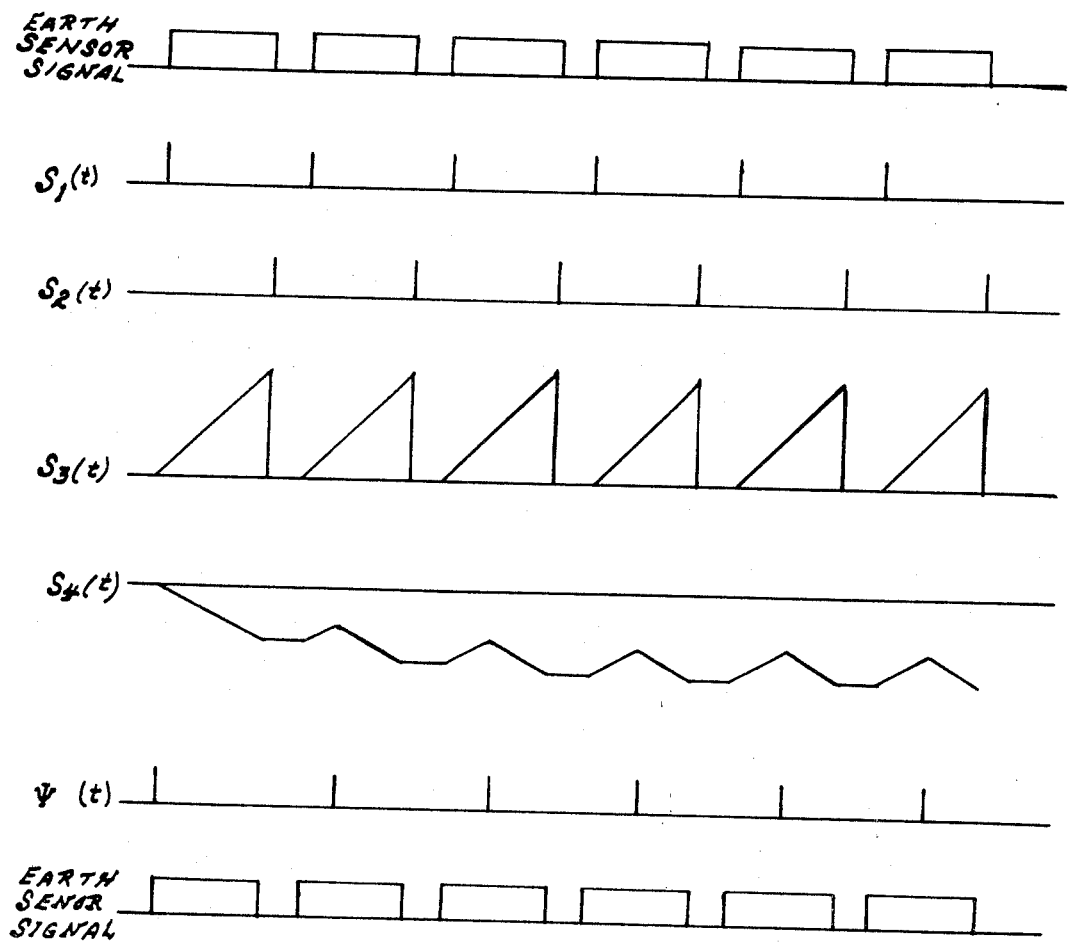
FIG. 4 is a graphic representation of the earth sensor and timing signals utilized within the vehicle attitude sensor apparatus.

The behavior of the various signals is shown as a function of time in FIG. 4. The waveforms show how the $\psi$ pulses approach the midpoint of the $S_1$ and $S_2$ pulses, starting with a $\psi$ pulse coincident with a $S_1$ pulse. An analysis shows that, in general, if $w$ denotes the separation between $S_1$ and $S_2$ pulses, then the separation between the $S_1$ and $\psi$ pulses is expressed as $$w\sum_{i=1}^{n}\left(\frac{1}{3}\right)^i + \xi\left(\frac{1}{3}\right)^n$$

where $\xi$ is the initial separation between the $S_1$ and $\psi$ pulses and $n$ is the elapsed number of spin cycles. Since the summation multiplying $w$ is the partial sum of a geometric series with ratio 1/3 the separation as $n$ grows clearly approaches $w/2$ as desired.

There are four normal sensor transitions which are denoted in time-from-apogee passage as $t_1$, $t_2$, $t_3$ and $t_4$. The geometry unique to these times is tangency of the plane normal to the spin axis through the spacecraft position and the earth surface. The analytic statement of this condition is that the cosine of the angle between the spin axis $(\pm \hat{Z})$ and the spacecraft position vector $\bar{r}$ equals the ratio of the earth radius $R$ to the spacecraft radius, $r$(magnitude of $\bar{r}$); i.e., $$\hat{z} \cdot (\bar{r}/r) = R/r \tag{4}$$

and $$-\hat{z} \cdot (\bar{r}/r) = R/r \tag{5}$$

The position vector r is constrained to the orbit and from orbit mechanics the magnitude is specified by $$r = p/(1+e\cos\nu) \tag{6}$$

where $p$ is the orbit parameter, $e$ is the eccentricity satisfying $0 < e < 1$, and $\nu$ is the true anomaly. Both $p$ and $e$ are constant and $\nu$ is a variable defined on the interval $-\pi \leq \nu \leq \pi$.

Throughout the time from $t_1$ to $t_4$ the spin axis orientation described by $z$ is taken to be inertially fixed. Introducing in-plane and out-of-plane error angles $\alpha$ and $\beta$, one writes that $$\hat{z}(\alpha,\beta) = \cos\beta\cos\alpha\,\hat{X} + \cos\beta\sin\alpha\,\hat{Y} + \sin\beta\,\hat{Z} \tag{7}$$

where $\hat{X}$ is the unit vector directed to perigee, $\hat{Y}$ is the unit vector parallel to the velocity vector at perigee and $\hat{Z}$ is normal to the orbit plane.

The unit vector along $\bar{r}$ is expressed in terms of the true anomaly by $$\bar{r}/r = \cos\nu\, \hat{X} + \sin\nu\, \hat{Y} \qquad (8)$$

Using Equations (4) through (8), the condition for tangency and normal sensor transition are expressed in terms of $\nu$, $\alpha$ and $\beta$ by $$F_1(\nu, \alpha, \beta) = 0 \qquad (9)$$

$$F_2(\nu, \alpha, \beta) = 0 \qquad (10)$$

where $$F_1(\nu,\alpha,\beta) = \cos\beta \cos(\nu-\alpha) - (R/p)(1+e\cos\nu) \qquad (11)$$

$$F_2(\nu,\alpha,\beta) = \cos\beta \cos(\nu-\alpha) + (R/p)(1+e\cos\nu) \qquad (12)$$

Equations (9) (10) determine (implicity) the values of $\nu$ as a function of $\alpha$ and $\beta$. It can be shown that with the weak restriction that $\cos\beta \quad R/r_p$, $r_p$ being the perigee radius, there are four and only four values of $\nu$ satisfying equations (9) and (10). Let $\nu_1$, $\nu_2$, $\nu_3$ and $\nu_4$ denote these values and suppose that $\nu_1<\nu_2<\nu_3<\nu_4$. The time from apogee passage corresponding to $\nu_i$ is the normal sensor transition time and is explicitly determined in the Keplerian orbit formulas $$\tan(E_i/2) = \sqrt{(1-e)/(1+e)}\, \tan(\nu_i/2) \qquad (13)$$

$$t_i = (T/2) + (E_i - e \sin E_i)(T/2\pi) \qquad (14)$$

where $T$ is the orbital period. Clearly, the $t_i$ are functionally dependent upon $\alpha$ and $\beta$ expressed by $$t_i = \theta_i(\alpha,\beta) \qquad (15)$$

Moreover, the measurement $$\delta = (t_4-t_3) - (t_2-t_1) \qquad (16)$$

is functionally dependent upon $\alpha$ and $\beta$. One has that $\delta = f(\alpha,\beta)$ and the inverse of $f$ relative to $\alpha$ exists such that $$\alpha = g(\delta,\beta) \qquad (17)$$

This means that the in-plane error angle $\alpha$ can be determined from the measurement $\delta$ and knowledge of $\beta$. Also any of the $t_i$, and in particular $t_4$, can be expressed in terms of $\delta$ and $\beta$, viz., $$t_4 = \theta_4(g(\delta,\beta), \beta) \qquad (18)$$

The prediction of the time to apogee passage $\tau$ is determined from the identity $\tau = T-t_4-\Delta$, the term $\Delta$ being the time elapsed from the transition $t_4$. Using equation (18) there results $$\tau = T-\theta_4(g(\delta,\beta), \beta) - \Delta \qquad (19)$$

Explicit, closed form expressions are not apparent, since the $\nu_i$ are only defined implicitly in equations (9) and (10). Precise numerical solutions result from a Newton-Raphson iteration and indicate that (1) small values of out-of-plane angles $\beta$ do not influence appreciably the value of $\tau$, and (2) the relationships among $\delta$, $\tau$ and small values of $\alpha$ appear linear.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may be used to advantage without a corresponding use of other features.

I claim:

1. A vehicle attitude sensor apparatus comprising in combination:

a means for sensing direction, said sensing means providing a pair of repetitve pulse signals, said pair of repetitive pulse signals being a first pulse train and a second pulse train, a frequency oscillator for generating pulses with a repetitive frequency greater than said pair of repetitive pulse signals, a first counter connected to said frequency oscillator, said first counter receiving said pulse from said frequency oscillator, said first counter receiving said pair of repetitive pulse signals, a first flip flop unit receiving said pulses from said frequency oscillator, said first flip flop providing an output signal, a second flip flop unit receiving said pair of repetitive pulse signals from said sensing means, said second flip flop providing an output signal, a third flip flop unit receiving said first pulse train, said third flip flop providing an output signal, an and gate having a first and second input, said and gate receiving said output signal from said first flip flop at said first input, said receiving said output signal from said second flip flop at said second input, said and gate providing an output signal, a second counter connected to said and gate to receive said output signal from said and gate, said second counter receiving said output signal from said third flip flop, said second counter providing an output signal, a comparator receiving said output signals from said first and second counters, said comparator comparing said output signals and providing an output signal, and, a one shot multivibrator receiving said output signal from said comparator, said multivibrator providing an output signal to said third flip flop, said output signal being the phase control pulse for said vehicle attitude.

2. A vehicle attitude sensor apparatus as described in claim 1 wherein said direction sensing means comprises:
  a sun sensor unit to sense the angle between the vehicle spin axis and the sun direction, said sun sensor providing an electronic pulse signal, said sun sensor being mounted on an $xz$ plane said pulse signal indicating coincidence of the sun direction with said $xz$ plane.

3. A vehicle attitude sensor apparatus as described in claim 1 wherein said direction sensing means comprises:
  an apogee earth sensor, said apogee earth sensor is mounted on said vehicle at an angle, said angle is canted with respect to the spin axis of said vehicle, said apogee earth sensor providing an output signal, and,
  a normal earth sensor being aligned orthogonally to said spin axis, said normal earth sensor scanning a plane normal to said spin axis, said normal earth sensor providing an output signal.

* * * * *